(12) United States Patent
Fujita

(10) Patent No.: US 6,585,096 B2
(45) Date of Patent: Jul. 1, 2003

(54) FRICTION PLATE AND MULTI-PLATE CLUTCH USING FRICTION PLATES

(75) Inventor: Kazuyuki Fujita, Fukuroi (JP)

(73) Assignee: NSK-Warner K. K., Tokyo (JP)

( * ) Notice: Subject to any disclaimer, the term of this patent is extended or adjusted under 35 U.S.C. 154(b) by 0 days.

(21) Appl. No.: 09/953,894

(22) Filed: Sep. 18, 2001

(65) Prior Publication Data

US 2002/0043441 A1 Apr. 18, 2002

(30) Foreign Application Priority Data

Sep. 19, 2000 (JP) .......................... 2000-283125

(51) Int. Cl.[7] .................... F16D 69/00; F16D 13/64; F16D 25/0638
(52) U.S. Cl. ................ 192/85 AA; 192/70.14; 192/107 R
(58) Field of Search .................... 192/70.14, 85 AA, 192/107 R

(56) References Cited

U.S. PATENT DOCUMENTS

| 4,260,047 A | * | 4/1981 | Nels ........................ 192/70.14 |
| 4,674,616 A | * | 6/1987 | Mannino, Jr. ........... 192/107 R |
| 5,332,075 A | * | 7/1994 | Quigley et al. ......... 192/107 R |
| 5,713,450 A | * | 2/1998 | Quigley ................... 192/107 R |
| 6,170,629 B1 | * | 1/2001 | Suzuki et al. ............ 192/107 R |

FOREIGN PATENT DOCUMENTS

EP         0 267 027 A1  *  5/1988

* cited by examiner

Primary Examiner—Richard M. Lorence
(74) Attorney, Agent, or Firm—Miles & Stockbridge P.C.

(57) ABSTRACT

In a friction plate obtained by adhering a plurality of friction material segments onto a core plate, and axial thickness of each of the friction material segment in areas including adjacent portions between the adjacent friction material segments is thinner than the other portion of the friction material segment.

14 Claims, 3 Drawing Sheets

FRICTION PLATE AND MULTI-PLATE CLUTCH USING FRICTION PLATES

BACKGROUND OF THE INVENTION

1. Field of the Invention

The present invention relates to an improvement in a friction plate and a multi-plate clutch using such friction plate, which are used as friction plates or a lock-up clutch in a wet type multi-plate friction engaging apparatus having a plurality of friction plates and used in an automatic transmission of a motor vehicle or a transmission of a motor bike.

2. Related Background Art

In the past, a friction plate was manufactured by adhering a plurality of friction material segments onto an annular core plate in a circular pattern. For example, as shown in FIG. 5, the friction material members were interconnected through a connection portion like a configuration of a piece of jigsaw puzzle.

In FIG. 5, a friction plate 21 is obtained by assembling three friction material segments 22 in a circular pattern and adhering these segments onto a core plate 23. Each friction material segment 22 has is provided at its both ends with a connecting portion 25 including a projection and a recess, and the adjacent friction material segments are interconnected by engaging with the connecting portions together. Further, the core plate 23 is provided at its inner periphery with splines 24 for connecting to a rotary shaft or the like (not shown).

However, when the friction material segment is manufactured by punching it from a friction material tape, burr can be generated at an edge of the punched friction material segment. Further, since adjacent sections (connection portions) between the friction material segments have weaker strength in comparison with the other part of the segment, when an engaging operation is repeated by numerous times, the adjacent section can be peeled or broken.

SUMMARY OF THE INVENTION

Therefore, an object of the present invention is to prevent an adjacent section of a friction material segment from being peeled or broken.

To achieve the above object, the present invention provides a friction plate obtained by adhering a plurality of friction material segments onto a core plate, wherein an axial thickness of the friction material segment in areas including adjacent portions between the adjacent friction material segments is thinner than the other portion of the friction material segment.

Further, to achieve the above object, the present invention provides a multi-plate clutch comprising a clutch case and a hub which are rotated relative to each other on the same axis, separator plates disposed on an inner periphery of the clutch case, friction plates disposed on an outer periphery of the hub and arranged alternately with the separator plates in an axial direction, and a piston for urging the separator plates and the friction plates to frictionally engaged the plates with each other, and in which input and output of a driving force is effected between the clutch case and the hub, and wherein each of the friction plates is formed by adhering a plurality of friction material segments to a core plate, and an axial thickness of the friction material segment in areas including adjacent portions between the adjacent friction material segments is thinner than the other portion of the friction material segment.

The friction plate according to an embodiment of the present invention is formed by providing areas each having a thickness thinner than that of the other portion at the adjacent portions of the friction material segment of the above-mentioned conventional friction plate. Such an area includes all shapes including the adjacent portions between the friction material segments and is not limited to a specific shape. Further, a depth of the area is not particularly limited and may be any depth so long as the area is slightly lower than a friction engaging surface of the friction plate.

The area is desirably formed by pressurization and compression, since strength of a boundary between the area and a portion other than the area can be maintained and the formation of the area can easily be achieved for a short time.

DESCRIPTION OF THE PREFERRED EMBODIMENTS

The present invention will now be explained in connection with an embodiment thereof with reference to the accompanying drawings.

Figure 4:
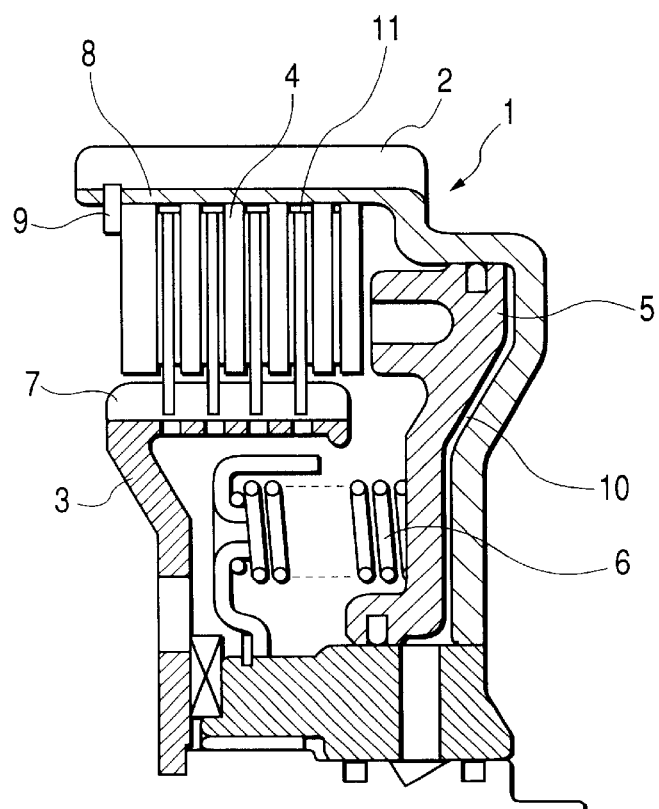
FIG. 4 is an axial partial sectional view of a wet type multi-plate clutch which can utilize the friction plates of the present invention.
Figure 5:
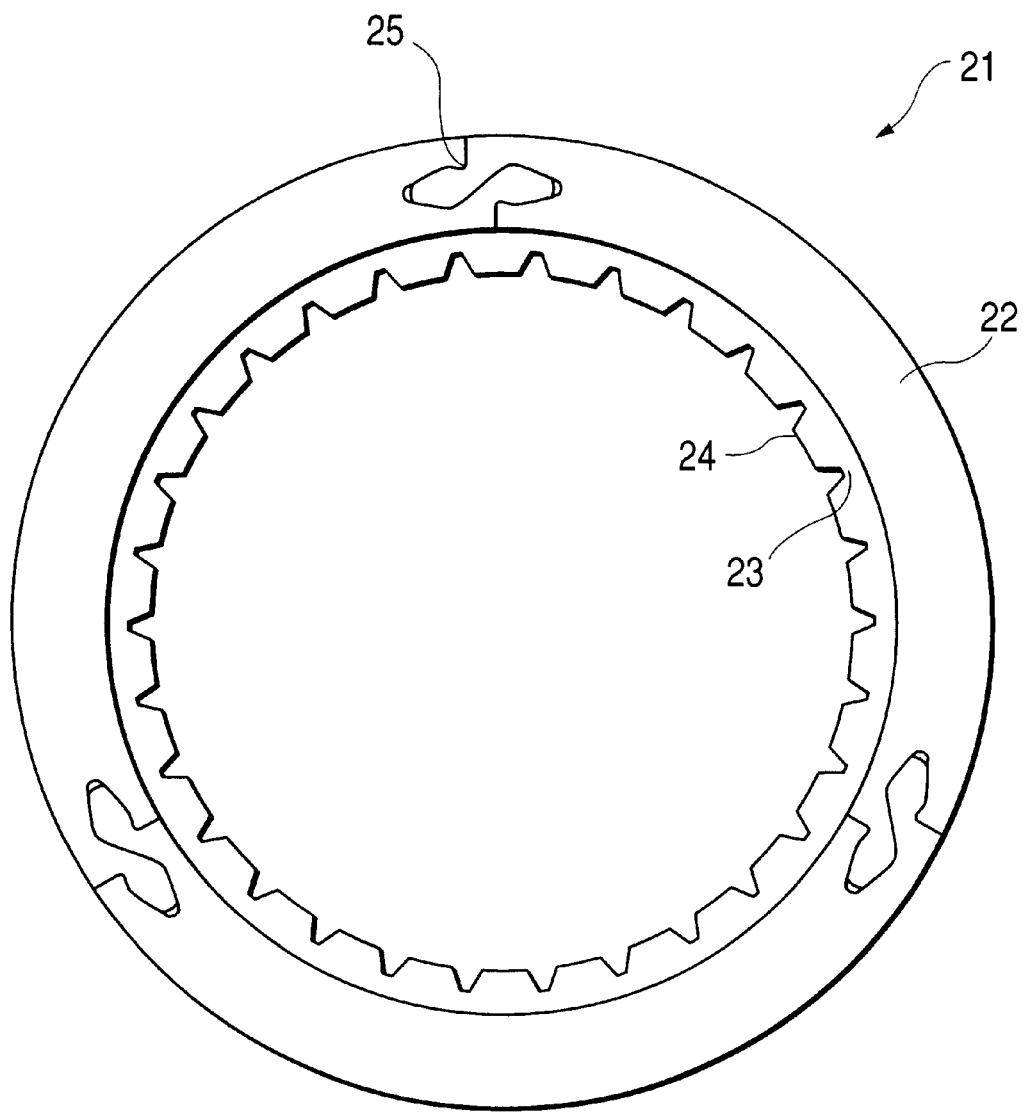
FIG. 5 is a front view of a conventional friction plate.

FIG. 4 is an axial partial sectional view of the wet type multi-plate clutch capable of utilizing friction plates of the present invention which will be described later. In the wet type multi-plate clutch 1, input and output of a driving force is effected by using a clutch case 2 and a hub 3 which are rotated relative to each other on the same axis. The hub 3 is provided at its outer periphery with splines 7 into which friction plates 11 are fitted so that the friction plates can be shifted in an axial direction.

On the other hand, the clutch case 2 is provided at its inner periphery with splines 8 into which separator plates 4 are fitted so that the separator plates can be shifted in an axial direction, and the separator plates are arranged alternately with the friction plates 11. The separator plates 4 and the friction plates 11 are positioned in the axial direction by a snap ring 9. Further, a piston 5 for urging the friction plates 11 and the separator plates 4 in the axial direction to frictionally engage the plates with each other is disposed within the clutch case 2. The piston 5 is biased by a return spring 6 in a direction along which an engaging condition between the separator plates 4 and the friction plates 11 is released.

The piston 5 is operated (shifted to the left in FIG. 4) in opposition to a biasing force of the return spring 6 by hydraulic pressure supplied into an oil chamber 10, thereby engaging the separator plates 4 and the friction plates 11 with each other. Further, when the hydraulic pressure is released, by the biasing force of the return spring 6, the piston 5 is shifted to the right in FIG. 4, thereby releasing the engaging condition between the friction plates 11 and the separator plates 4.

Figure 1:
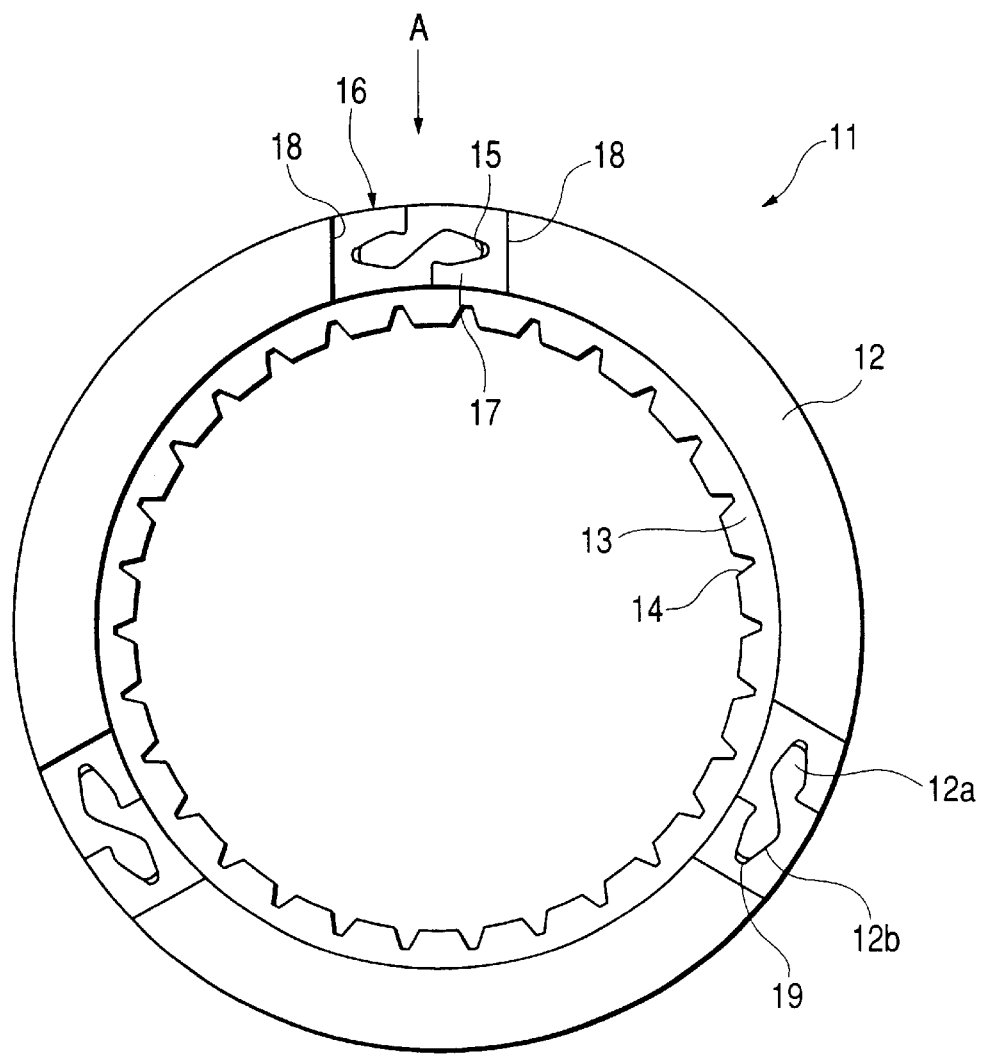
FIG. 1 is a front view of a friction plate according to an embodiment of the present invention.

FIG. 1 is a front view of the friction plate according to an embodiment of the present invention and more specifically a front view of the friction plate 11 used in the wet type multi-plate clutch 1 shown in FIG. 4. The friction plate 11 is formed by assembling three friction material segments 12 each of which has an arcuated shape obtained by dividing a ring into three in a circumferential direction in a substantially annular pattern and by adhering securing the segments to a substantially annular core plate 13.

Each friction material segment 12 has connecting portions 15 each including a set of projection 12a and recess 12b, and the adjacent friction material segments are joined to each other by fitting the projection 12a of one of the friction material segments 12 into the recess 12b of the other friction material segment. Further, the core plate 13 is provided at its inner periphery with splines 14 which are fitted into the splines 7 formed on the outer periphery of the hub 3 of the wet type multi-plate clutch 1.

The projection 12a and the recess 12b have complementary shapes. Further, in a fitting condition that the projection and the recess are fitted into with each other, a small gap 19 is formed between a distal end of the projection 12a and a bottom of the recess 12b. The gap 19 is provided to prevent burr from being formed due to swelling of a boundary therebetween caused by squeezing the projection 12a within the recess 12b during repeated engaging operations between the friction plate and the separator plate.

Figure 2:
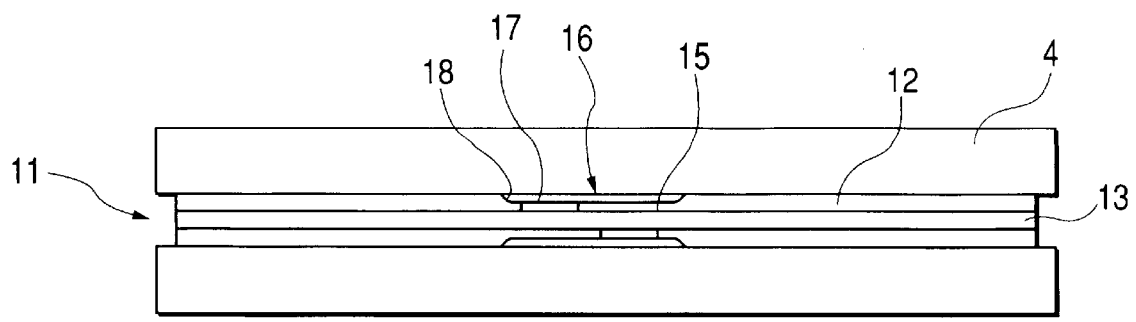
FIG. 2 is a side view looked at from a direction shown by the arrow A in FIG. 1.

An area 16 partitioned by a boundary 18 and encircling the connecting portion 15 is thinner than the other portion of the friction material segment 12 other than the area 16. In other words, a surface of the area 16 opposed to the separator plate 4 is lower than the other surface of the friction material segment 12. It is designed so that the connecting portion 15 is positioned on a bottom 17 of the area 16. As can be seen in FIG. 2 which will be described later, the area 16 has a configuration having a wider recessed portion or groove as a whole.

Formation of the area 16 is achieved by pressurization and compression by means of a press after the friction material segments 12 interconnected in the annular pattern are adhered to the core plate 13. In general, since the adhesion of the friction material segments 12 interconnected in the annular pattern to the core plate 13 is achieved by pressurizing the segments while heating them, when the areas 16 are formed simultaneously with the pressurization in the adhering process, productivity can be enhanced. Of course, it should be noted that the friction material segment 12 can be pressurized and compressed before it is adhered to the core plate 13.

FIG. 2 is a side view looked at from a direction shown by the arrow A in FIG. 1. It can be seen that the area 16 is formed as the recessed portion directing from the surface of the friction material segment 12 toward the core plate 13. When the piston 5 of the wet type multi-plate clutch 1 is operated, as shown in FIG. 2, each friction plate 11 is pinched by the separator plates 4 from both sides. However, since the connecting portions 15 are positioned on the bottoms of the areas 16, they are not contacted with the separator plate 4. Accordingly, since the connecting portions are not directly subjected to a shearing force, peeling and/or breaking do not occur.

Further, if the area 16 is shallow and the bottom 17 of the area 16 is contacted with the separator plate 4 by elasticity of the friction material segment 12 during the engagement of the wet type clutch 1, since surface pressure of the area is smaller than that of the portion other than the area 16 and is hard to be subjected to the shearing force, the separating or peeling of the connection portion 15 can be suppressed. In case of a lock-up clutch, it is preferable that the area is made shallower in order to prevent passage of lubricating oil through the area 16.

Figure 3:
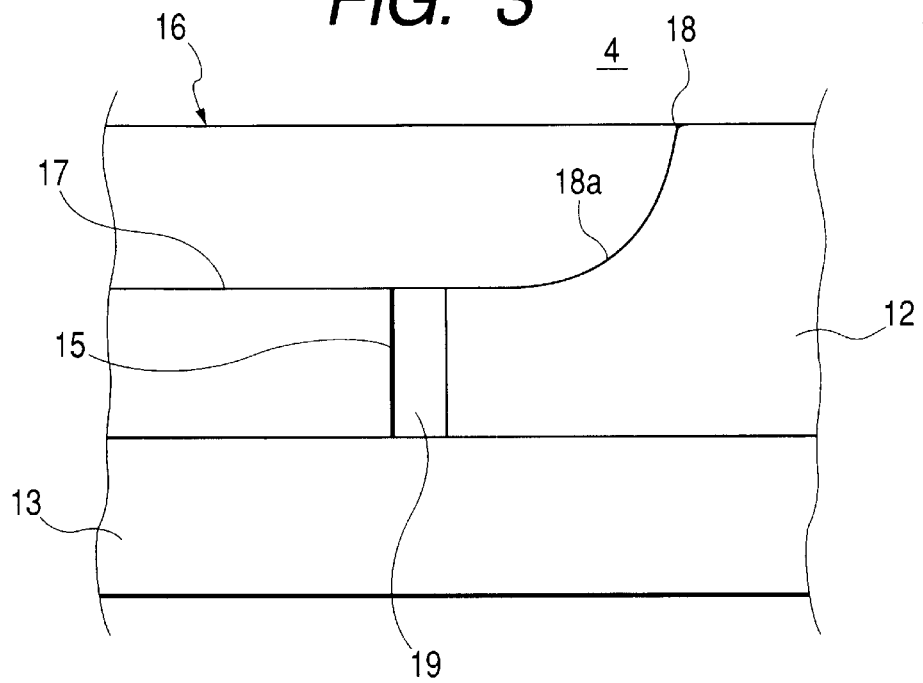
FIG. 3 is an enlarged view showing a part of an interface of FIG. 2.

FIG. 3 is an enlarged view of the vicinity of the boundary 18. As apparent from FIG. 3, the boundary 18 is formed so that the boundary between the area 16 and the portion other than the area 16 has an arcurated portion 18a in an axial section. Due to presence of such an arcuated shape, stress generated by the shearing force during the engagement of the clutch can be released.

In the above explanation, while the embodiment of the present invention was described, the present invention is not limited to such embodiment but can be applied to any friction plate having friction material segments as constructural parts. For example, the present invention can be applied to a friction plate in which friction material segments having no connecting portion are assembled and adhered to a core plate or a friction plate in which oil paths are formed by providing gaps between the friction material segments. Further, it should be noted that the shape and number of the areas, and the shape and divided number of the friction material segments can be selected appropriately. Further, it should be noted that a term "adjacent portion" in the specification means a case where the friction material segments are disposed adjacent to and contacted with each other through the connecting portions and a case where, as mentioned above, the gap is formed between the friction material segments (non-contact type). In addition, the present invention can be applied to not only the wet type clutch but also a dry type multi-plate clutch.

According to the friction plate of the present invention as described above, the following advantages can be achieved.

Since the axial thickness of the area including the adjacent portion between the friction material segments is thinner than the other portion of each friction material segment, the connecting portion can be prevented from abutting against the separator plate, and the peeling and/or breaking of the circumferential ends, connecting portions and boundary portions of the friction material segment can be suppressed or prevented.

By providing the recessed portion in the area by pressurization and compression, the strength of the boundary between the area and the portion other than the area can be maintained, and the area can easily be formed for a short time.

Further, since the boundary between the area and the surface of the friction material segment is formed as the arcuated shape, the stress caused by the shearing force during the engagement of the clutch can be released.

What is claimed is:

1. A friction plate obtained by adhering a plurality of friction material segments onto a core plate, wherein:
   first and second connecting portions are provided at first and second circumferential ends, respectively, of each said friction material segment,
   said first connecting portion includes a projection and said second connecting portion includes a recess, said projection of said first connecting portion of said friction material segment being received in said recess of said second connecting portion of an adjacent friction material segment,
   first and second areas of reduced axial thickness are provided at said first and second circumferential ends of each said friction material segment, and
   said first and second connecting portions are located within said first and second areas of reduced axial thickness.

2. A friction plate according to claim 1, wherein said areas of reduced axial thickness are formed by pressurization and compression.

3. A friction plate according to claim 1, wherein said areas of reduced axial thickness are recessed from a friction engaging surface of said friction material segment toward said core plate.

4. A friction plate according to claim 1, wherein a boundary between at least one of said areas of reduced axial thickness and the surface of said friction material segment has an arcuate axial cross-section.

5. A friction plate according to claim 1, wherein a circumferential gap is formed between said projection of said friction material segment and said recess of the adjacent friction material segment.

6. A friction plate according to claim 1, wherein said area of reduced axial thickness has an axial thickness predetermined to prevent passage of lubricating oil in a clutch when said clutch is engaged.

7. A friction plate according to claim 1, wherein said areas of reduced axial thickness extend over substantially the entire radial width of said friction material segment.

8. A multi-plate clutch comprising:
   a clutch case and a hub which are rotated relative to each other on the same axis;
   at least one separator plate disposed on an inner periphery of said clutch case;
   at least one friction plate disposed on an outer periphery of said hub and arranged alternately with said separator plate in an axial direction; and
   a piston which urges said separator plate and said friction plate to frictionally engage said plates with each other;
   and wherein
      input and output of a driving force is effected between said clutch case and said hub;
      and further wherein
         said friction plate is formed by adhering a plurality of friction material segments to a core plate,
         first and second connecting portions are provided at first and second circumferential ends, respectively, of each said friction material segment,
         said first connecting portion including a projection and said second connecting portion including a recess, said projection of said first connecting portion of said friction material segment being received in said recess of said second connecting portion of an adjacent friction material segment,
         first and second areas of reduced axial thickness are provided at said first and second circumferential ends of said friction material segment, and
         said first and second connecting portions are located within said first and second areas of reduced axial thickness.

9. A multi-plate clutch according to claim 8, wherein said areas of reduced axial thickness are formed by pressurization and compression.

10. A multi-plate clutch according to claim 9, wherein said areas of reduced axial thickness are recessed from a friction engaging surface of said friction material segment toward said core plate.

11. A multi-plate clutch according to claim 10, a boundary between at least one of said areas of reduced axial thickness and the surface of said friction material segment has an arcuate axial cross-section.

12. A multi-plate clutch according to claim 8, wherein a circumferential gap is formed between said projection of said friction material segment and said recess of the adjacent friction material segment.

13. A multi-plate clutch according to claim 8, wherein said area of reduced axial thickness has an axial thickness predetermined to prevent passage of lubricating oil when said clutch is engaged.

14. A multi-plate clutch according to claim 8, wherein said areas of reduced axial thickness extend over substantially the entire radial width of said friction material segment.

* * * * *